United States Patent
Laaksonen et al.

(10) Patent No.: US 9,888,169 B2
(45) Date of Patent: Feb. 6, 2018

(54) METHOD, APPARATUS AND COMPUTER PROGRAM FOR AUTOMATICALLY CAPTURING AN IMAGE

(71) Applicant: Nokia Technologies Oy, Espoo (FI)

(72) Inventors: Lasse Juhani Laaksonen, Tampere (FI); Miikka Tapani Vilermo, Siuro (FI); Arto Juhani Lehtiniemi, Lempäälä (FI); Mikko Tapio Tammi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/880,655

(22) Filed: Oct. 12, 2015

(65) Prior Publication Data
US 2016/0105602 A1 Apr. 14, 2016

(30) Foreign Application Priority Data
Oct. 14, 2014 (EP) ..................................... 14188897

(51) Int. Cl.
*H04N 5/232* (2006.01)
*G06F 3/0488* (2013.01)
*G06F 3/0484* (2013.01)

(52) U.S. Cl.
CPC ..... *H04N 5/23216* (2013.01); *G06F 3/04842* (2013.01); *G06F 3/04883* (2013.01); *H04N 5/23222* (2013.01); *H04N 5/23293* (2013.01)

(58) Field of Classification Search
CPC ............ G06F 3/04842; G06F 3/04883; H04N 5/23216; H04N 5/23222; H04N 5/23293
See application file for complete search history.

(56) References Cited

U.S. PATENT DOCUMENTS

| | | | | |
|---|---|---|---|---|
| 7,443,447 B2 * | 10/2008 | Shirakawa | ........... | H04N 5/2251 348/262 |
| 8,330,866 B2 * | 12/2012 | Walker | ................... | H04H 20/26 348/565 |
| 8,866,943 B2 * | 10/2014 | Park | ................... | H04N 5/23222 348/139 |
| 8,953,079 B2 * | 2/2015 | Raju | .................... | H04N 5/2624 348/14.02 |
| 9,015,242 B2 * | 4/2015 | Dorso | ................. | H04L 65/1069 709/201 |

(Continued)

FOREIGN PATENT DOCUMENTS

EP 2757774 A1 7/2014
JP H05196860 A 8/1993

OTHER PUBLICATIONS

Extended European Search Report received for corresponding European Patent Application No. 14188897.4, dated Apr. 8, 2015, 8 pages.

(Continued)

*Primary Examiner* — Amy Hsu
(74) *Attorney, Agent, or Firm* — Alston & Bird LLP

(57) ABSTRACT

An apparatus comprising: means for processing, at a first time, a user-input to determine a position condition defined in respect of an object that is yet to be included in a sensed image; and means for automatically capturing, after the first time, a sensed image including a first object not included in the sensed image at the first time, in response to determination that the user-input position condition is satisfied in respect of the first object.

18 Claims, 4 Drawing Sheets

(56) References Cited

U.S. PATENT DOCUMENTS

| | | | |
|---|---|---|---|
| 2005/0018066 A1 | 1/2005 | Hofer | |
| 2005/0163345 A1* | 7/2005 | van den Bergen | G08B 13/19682 382/103 |
| 2006/0152636 A1* | 7/2006 | Matsukawa | G08B 13/19667 348/715 |
| 2006/0227862 A1* | 10/2006 | Campbell | G06K 9/00778 375/240 |
| 2007/0279482 A1* | 12/2007 | Oswald | H04N 7/142 348/14.02 |
| 2009/0015703 A1* | 1/2009 | Kim | G03B 29/00 348/333.12 |
| 2009/0295976 A1* | 12/2009 | Choi | H04N 5/23293 348/333.11 |
| 2010/0141781 A1* | 6/2010 | Lu | G06K 9/00912 348/222.1 |
| 2010/0321534 A1* | 12/2010 | Kim | G06T 11/00 348/239 |
| 2011/0050976 A1* | 3/2011 | Kwon | H04N 5/23219 348/333.04 |
| 2011/0058051 A1* | 3/2011 | Jeon | G06F 3/012 348/211.11 |
| 2011/0300910 A1* | 12/2011 | Choi | G06F 3/0482 455/566 |
| 2011/0317031 A1* | 12/2011 | Honda | H04N 5/23219 348/229.1 |
| 2012/0050587 A1* | 3/2012 | Yamamoto | H04N 5/23293 348/262 |
| 2012/0105579 A1* | 5/2012 | Jeon | H04N 5/2258 348/38 |
| 2012/0113216 A1* | 5/2012 | Seen | H04N 5/23293 348/38 |
| 2012/0120186 A1* | 5/2012 | Diaz | H04N 5/2258 348/36 |
| 2012/0236198 A1 | 9/2012 | Hamada | |
| 2012/0257025 A1* | 10/2012 | Kim | H04N 13/0497 348/51 |
| 2012/0274808 A1* | 11/2012 | Chong | H04N 5/23293 348/234 |
| 2013/0038759 A1* | 2/2013 | Jo | H04N 5/2256 348/240.99 |
| 2013/0235224 A1* | 9/2013 | Park | H04N 5/23222 348/218.1 |
| 2013/0314511 A1* | 11/2013 | Chen | H04N 5/23222 348/50 |
| 2013/0329060 A1* | 12/2013 | Yim | G06F 17/30244 348/207.1 |
| 2013/0329100 A1* | 12/2013 | Desai | H04N 5/2258 348/262 |
| 2014/0028835 A1 | 1/2014 | Sugawara | |
| 2014/0071323 A1* | 3/2014 | Yi | G06F 3/04883 348/333.01 |
| 2014/0118595 A1* | 5/2014 | Jung | H04N 5/23293 348/333.01 |
| 2014/0168470 A1* | 6/2014 | Yoshino | G06F 3/0488 348/231.7 |
| 2014/0232906 A1* | 8/2014 | Ha | H04N 5/265 348/239 |
| 2014/0232921 A1* | 8/2014 | Kim | H04N 5/23293 348/333.05 |
| 2014/0240469 A1* | 8/2014 | Lee | H04N 13/025 348/48 |
| 2014/0240579 A1* | 8/2014 | Park | G06F 3/0484 348/333.11 |
| 2016/0109545 A1* | 4/2016 | Forthmann | G01R 33/543 382/131 |

OTHER PUBLICATIONS

Order Remanding to the Examiner for U.S. Appl. No. 10/116,312 dated Aug. 26, 2008.

Office Action for European Patent Application No. 14188897.4 dated Oct. 25, 2017, 6 pages.

* cited by examiner

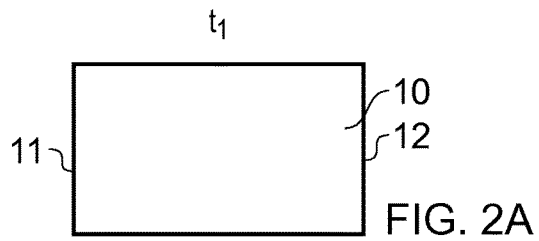
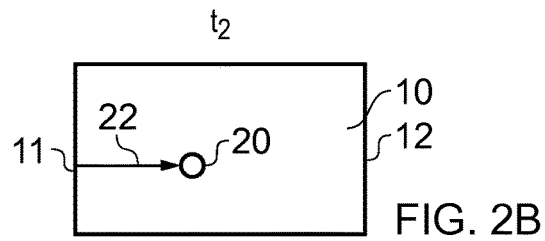
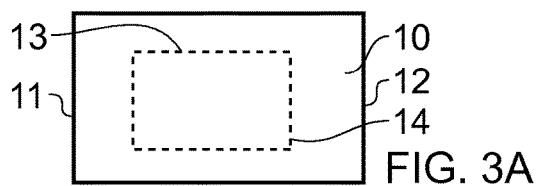
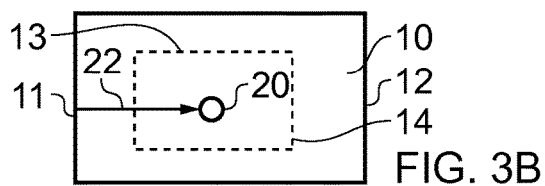
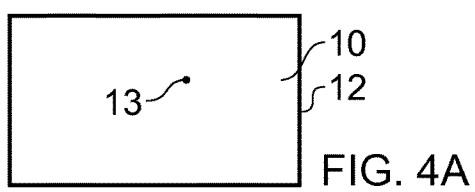
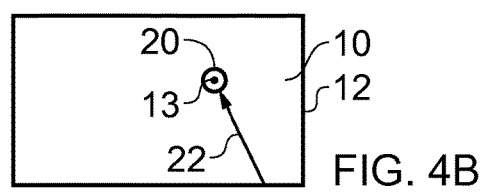
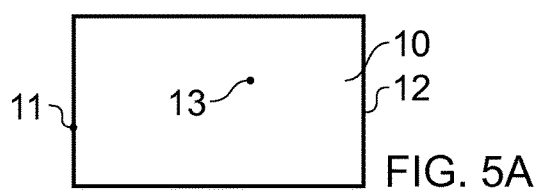
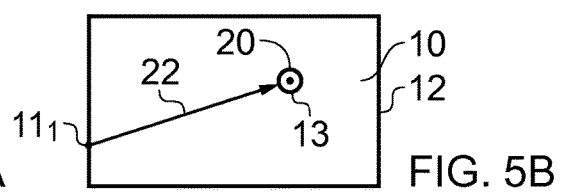
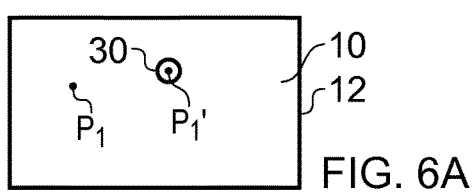
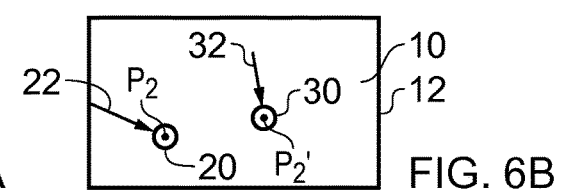
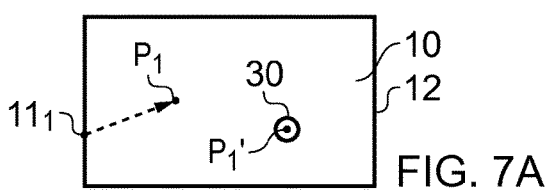
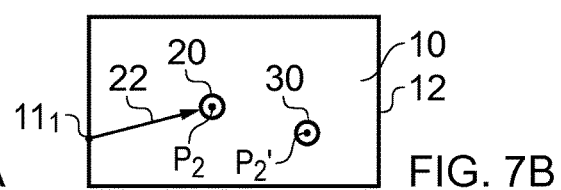
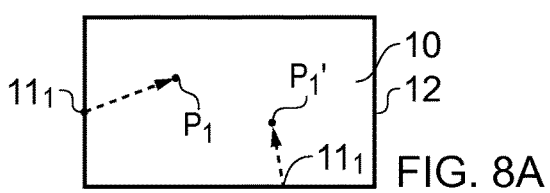
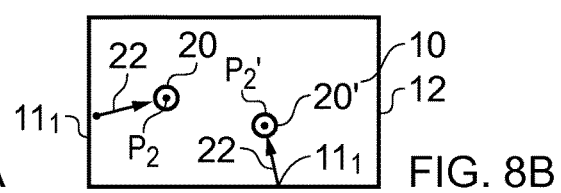

METHOD, APPARATUS AND COMPUTER PROGRAM FOR AUTOMATICALLY CAPTURING AN IMAGE

TECHNOLOGICAL FIELD

Embodiments of the present invention relate to a method, apparatus and computer program for automatically capturing an image.

BACKGROUND

There are occasions when it would be desirable to automatically capture an image.

BRIEF SUMMARY

According to various, but not necessarily all, embodiments of the invention there is provided examples as claimed in the appended claims.

According to various, but not necessarily all, embodiments of the invention there is provided an apparatus comprising: means for processing, at a first time, a user-input to determine a position condition defined in respect of an object that is yet to be included in a sensed image; and means for automatically capturing, after the first time, a sensed image including a first object not included in the sensed image at the first time, in response to determination that the user-input position condition is satisfied in respect of the first object.

According to various, but not necessarily all, embodiments of the invention there is provided method comprising: at a first time, processing a user-input to determine a position condition defined in respect of an object that is yet to be included in a sensed image; after the first time, automatically capturing a sensed image including a first object not included in the sensed image at the first time, in response to an automatic determination that the user-input position condition is satisfied in respect of the first object.

According to various, but not necessarily all, embodiments of the invention there is provided a computer program that when run on a processor enables:

at a first time, processing a user-input to determine a position condition defined in respect of an object that is yet to be included in a sensed image; and after the first time, automatically capturing a sensed image including a first object not included in the sensed image at the first time, in response to an automatic determination that the user-input position condition is satisfied in respect of the first object.

According to various, but not necessarily all, embodiments of the invention there is provided an apparatus comprising:

at least one processor; and at least one memory including computer program code the at least one memory and the computer program code configured to, with the at least one processor, cause the apparatus at least to perform:

at a first time, processing a user-input to determine a position condition defined in respect of an object that is yet to be included in a sensed image; and after the first time, automatically capturing a sensed image including a first object not included in the sensed image at the first time, in response to determination that the user-input position condition is satisfied in respect of the first object.

BRIEF DESCRIPTION

For a better understanding of various examples that are useful for understanding the brief description, reference will now be made by way of example only to the accompanying drawings in which:

FIGS. 2A & 2B, 3A & 3B, 4A & 4B, 5A & 5B, 6A & 6B, 7A & 7B, 8A & 8B illustrate how different examples of position conditions defined in respect of an object that is yet to be included in a sensed image control automatic capturing of a sensed image;

DETAILED DESCRIPTION

Figure 1:
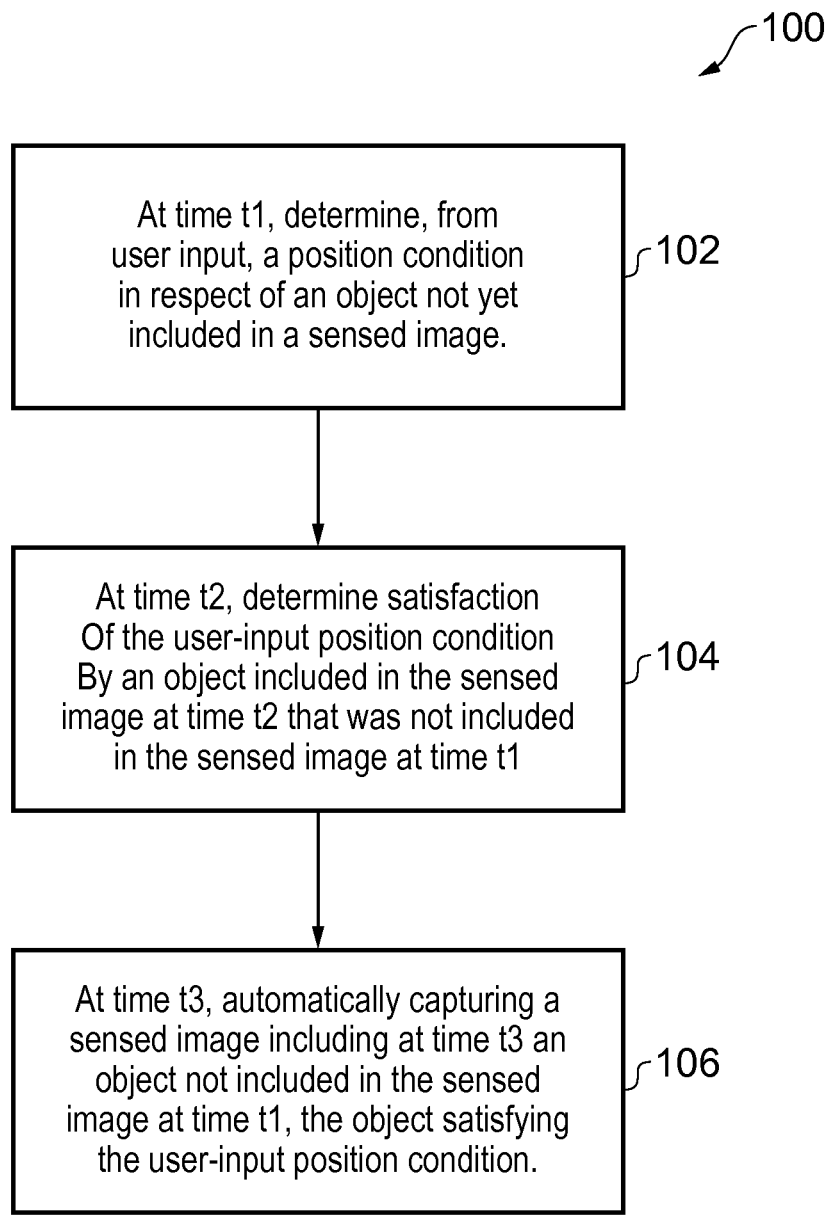
FIG. 1 illustrates an example of a method for automatically capturing a sensed image when it includes an object.

There are occasions when it would be desirable to automatically capture a sensed image, for example, when an image scene changes too quickly for a user to react. This may, for example, occur when an object suddenly enters the image scene.

In this patent, the term "object" refers to a portion of the content of the sensed image that moves relative to a reference. The portion of the sensed image that represents an 'object' may be a minority portion of the sensed image, that is, it occupies less than 50% of the sensed image. In some but not necessarily all examples it may occupy less than 20%, 10% or 5% of the sensed image. An "object" may represent in the image an inanimate object (e.g. a thing) or an animate object (e.g. person, animal, etc.). The appearance of an object may be constant or stable as it moves within the sensed image or its appearance may change as it moves. Where change occurs there may be continuity between the changing appearances.

The reference may, for example, be one or more apparatus-determined references. An apparatus-determined reference is defined relative to the apparatus that senses the image. An example of an apparatus-determined reference is a reference frame or a perimeter of the image defined by the image sensor.

The reference may alternatively be, for example, one or more image-determined references. An image determined reference is defined relative to the sensed image. An example of an image-determined reference is a reference portion of the content of the sensed image. The reference portion of the image may be, for example an object. The reference portion of the image may be stationary or moving within the sensed image.

Automatic capture of a sensed image may occur in response to determination that a user-input position condition is satisfied in respect of an object. The user-input position condition may be defined in respect of an object that is yet to be included in the sensed image The user-input position condition may be defined in relation to a user-defined reference or may be defined in relation to a default reference or an automatically defined reference.

The user-input position condition may, for example, be defined in relation to one or more kinematic parameters of the object. Kinematic parameters may be scalar, for example distance from the reference or a time derivative of distance from the reference or may be vector for example displacement from the reference or a time derivative of displacement from the reference.

Some of the examples given below allow a user to control which object entering an image scene triggers automatic capture of the image.

Some of the examples given below allow a user to control when an object entering an image scene triggers automatic capture of the image.

Some of the examples given below allow a user to exercise control using gestures, for example, touch inputs on a touch sensitive display.

Some of the examples given below use camera settings when automatically capturing an image that have been automatically pre-set.

FIG. 1 illustrates an example of a method 100. The method 100 is for automatically capturing a sensed image when it includes an object that satisfies a user-input position condition and that was not included in the sensed image when the user-input position condition was defined. Using the method 100, the user is therefore able to anticipate the entry of an object into a sensed image and control, using the user-defined position condition, the automatic capture of the sensed image when the anticipated entry of an object occurs.

At block 102, at a time t1, the method 100 determines, from user input, a position condition in respect of an object not yet included in a sensed image.

Next at block 104, at a time t2, the method 100 determines, satisfaction of the user-input position condition (determined at block 102) by an object included in the sensed image at time t2 that was not included in the sensed image at time t1.

Next at block 106, at time t3 which may be simultaneous with or just after time t2, the method 100 automatically captures a sensed image including at time t3 an object not included in the sensed image at time t1, the object satisfying the user-input position condition.

FIGS. 2A, 3A, 4A ... 8A illustrate examples of determining, at a first time t1, a position condition defined in respect of an object 20 that is yet to be included in a sensed image 10. This corresponds to block 102 of FIG. 1. The position condition defines when automatic capture of a sensed image occurs.

FIGS. 2B, 3B, 4B ... 8B illustrate examples of automatically capturing, after the first time, a sensed image 10 including a first object 20 not included in the sensed image 10 at the first time t1, in response to an automatic determination that the user-input position condition is now satisfied in respect of the first object 20. This corresponds to block 106 of FIG. 1.

In some, but not necessarily all examples, the position condition defines an entry position where an object 20 enters a sensed image 10. In such cases, it is a necessary condition for satisfaction of the position condition that an object 20, that is to be captured in a sensed image 10, has entered 22 the sensed image 10 via the entry position.

The entry position may be defined by a user touch input on a touch display displaying the sensed image 10 at the first time t1.

The sensed image 10 has a perimeter 12, and the entry position 11 may be a portion of the perimeter 12. The entry position may be a whole of an edge or edges of the perimeter 12 or may be a sub-part or sub-parts of the perimeter 12 or may be a point or points on the perimeter 12.

In some, but not necessarily all examples, the position condition defines a capture position where an object 20, that is yet to be included in the sensed image at the first time, is positioned when automatic capture of the sensed image 10 occurs. It is a necessary condition for satisfaction of the position condition that an object 20, that is to be captured in a sensed image 10, has moved 22 to the capture position. Automatic capture of a sensed image 10 occurs, when the sensed image 10 includes an object 20, not included in the sensed image at the first time t1, that is at the capture position and which satisfies the position condition. The captured image includes an object 20, not included in the sensed image at the first time, that is located at the capture position.

The capture position may be defined by one or more user touch inputs on a touch display displaying the sensed image 10 at the first time t1. The capture position may be defined automatically or manually. The capture position may be defined relative to a reference. The reference may, for example, be an apparatus-determined reference that is defined relative to the apparatus that senses the image. An example of an apparatus-determined reference is a perimeter of the sensed image defined by the image sensor. The reference may alternatively be an image-determined reference that is defined relative to the sensed image. An example of an image-determined reference is a reference portion of the content of the sensed image. The reference portion of the image may be, for example an object. The reference portion of the image may be stationary or moving within the sensed image. The capture position may be defined in relation to the reference for example distance from the reference or displacement from the reference. As examples, the capture position may be defined as an absolute position within the sensed image 10 relative to a perimeter of the sensed image 10 or the capture position may be defined as a relative position relative to another object within the sensed image 10.

Figure 11:
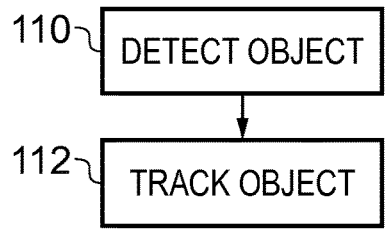
FIG. 11 illustrates an example of an algorithm for detecting a moving object and for tracking a moving object.

It can be determined that an object 20 has satisfied a position condition using image processing algorithms for object detection and tracking. This corresponds to block 104 of FIG. 1. For example, as illustrated in FIG. 11, by monitoring changes over time of the pixels of the sensed image 10, the algorithm detects 110 a moving object 20 (a group of contiguous pixels that changes position). The detected object 20 may, for example, be an object that has newly entered into the sensed image 10. The algorithm tracks 112 the object (the group of contiguous pixels) through the sensed image 10 and can determine when the object has reached a particular position within the sensed image 10 or relative to another object within the sensed image 10. Suitable algorithms for detecting and tracking objects are known to the person of ordinary skill in the art.

Referring to FIGS. 2A and 2B, the position condition defines an entry position 11 where an object 20 enters a sensed image 10.

In this example, it is necessary and sufficient for satisfaction of the position condition that an object 20, that is to be captured in a sensed image 10, has entered 22 the sensed image 10 via the entry position 11.

The entry position 11 may be defined by a user touch input on a touch display displaying the sensed image 10 at the first time t1.

Referring to FIGS. 3A and 3B, the position condition defines an entry position 11 where an object 20 enters a sensed image 10 and defines a capture position where that object 20 is positioned when automatic capture of the sensed image 10 occurs.

In this example, it is necessary and sufficient for satisfaction of the position condition that an object 20, that is to be captured in a sensed image 10, has entered 22 the sensed image 10 via the entry position 11 and that the object 20 has moved 22 to the capture position.

The entry position 11 may be defined by a user touch input on a touch display displaying the sensed image 10 at the first time t1.

The capture position may be defined automatically at time t1 in response to defining the entry position 11.

In this example, the capture position 13 is defined as an absolute position 14 within the sensed image 10 relative to a perimeter 12 of the sensed image 10.

The capture position may be a locus of positions at specified distances from the perimeter 12. In the illustrated example, the locus is a rectangle and automatic capture occurs when the object 20 enters the rectangle. The capture position 13 may be a predefined distance, within the sensed image, from a perimeter 12 of the sensed image 10.

Alternatively, the capture position may be a predetermined distance from the entry point 11.

Referring to FIGS. 4A and 4B, the position condition does not define an entry position 11 where an object 20 enters a sensed image 10 but does define a capture position where an object 20 is positioned when automatic capture of the sensed image 10 occurs.

In this example, it is necessary and sufficient for satisfaction of the position condition that an object 20, that is to be captured in a sensed image 10, has entered 22 the sensed image 10 via any entry position and that the newly entered object 20 has moved 22 to the capture position 13.

The capture position 13 may be defined by a user touch input on a touch display displaying the sensed image 10 at the first time t1.

In this example, the capture position 13 is user-defined as an absolute position within the sensed image 10 relative to a perimeter 12 of the sensed image 10.

Referring to FIGS. 5A and 5B, the position condition defines an entry position 11 where an object 20 enters a sensed image 10 and defines a capture position 13 where an object 20 is positioned when automatic capture of the sensed image 10 occurs.

In this example, it is necessary and sufficient for satisfaction of the position condition that an object 20, that is to be captured in a sensed image 10, has entered 22 the sensed image 10 via the entry position 11 and that the object 20 has moved 22 to the capture position 13.

The entry position 11 may be defined by a user touch input on a touch display displaying the sensed image 10 at the first time t1.

The capture position 13 may be defined by a user touch input on a touch display displaying the sensed image 10 at the first time t1.

In this example, the capture position 13 is defined as an absolute position within the sensed image 10 relative to the entry position 11.

Referring to FIGS. 6A and 6B, the position condition does not define an entry position 11 where an object 20 enters a sensed image 10 but does define a capture position where an object 20 is positioned when automatic capture of the sensed image 10 occurs.

In this example, it is necessary and sufficient for satisfaction of the position condition that an object 20, that is to be captured in a sensed image 10, has entered 22 the sensed image 10 via any entry position and that the object 20 has moved 22 to the capture position.

In this example, the capture position is user-defined as a relative displacement within the sensed image 10. In this example, the relative displacement is defined as the position between a user input position P1 and the position P1' of an object 30 that is included in the sensed image 10 at the first time t1. The relative displacement is P1'-P1.

In this example, it is necessary and sufficient for satisfaction of the position condition that an object 20, that is to be captured in a sensed image 10, has entered 22 the sensed image 10 via any entry position and that the object 20 has moved 22 to a position such that the relative displacement (P2'-P2) between a position P2 of the object 20 that has entered the sensed image 10 and the position P2' of the object 30 previously included in the sensed image 10 at the first time t1, equals the relative displacement P1'-P1.

The capture position may be defined by one or more user touch inputs on a touch display displaying the sensed image 10 at the first time t1. The user input position P1 may be defined by a user touch input on a touch display displaying the sensed image 10 at the first time t1. The position P1' of an object that is included in the sensed image 10 at the first time t1 may be defined by a user touch input on a touch display displaying the sensed image 10 at the first time t1.

It will be appreciated that in this example, the new object 20 is detected and tracked and, also, the existing object 30 is detected and tracked.

Referring to FIGS. 7A and 7B, the position condition defines an entry position $11_1$ where an object 20 enters a sensed image 10 and defines a capture position where the object 20 is positioned when automatic capture of the sensed image 10 occurs.

In this example, it is necessary and sufficient for satisfaction of the position condition that an object 20, that is to be captured in a sensed image 10, has entered 22 the sensed image 10 via the entry position $11_1$ and that the object 20 has moved 22 to the capture position.

In this example, the capture position is user-defined as a relative displacement within the sensed image 10. In this example, the relative displacement is defined as the position between a user input position P1 and the position P1' of an object 30 that is included in the sensed image 10 at the first time t1. The relative displacement is P1'-P1.

In this example, it is necessary and sufficient for satisfaction of the position condition that an object 20, that is to be captured in a sensed image 10, has entered 22 the sensed image 10 via the entry position $11_1$ and that the object 20 has moved 22 to a position such that the relative displacement P2'-P2 between a position P2 of the object 20 that has entered the sensed image 10 and the position P2' of the object 30 previously included in the sensed image 10 at the first time t1, equals the relative displacement P1'-P1.

The capture position may be defined by one or more user touch inputs on a touch display displaying the sensed image 10 at the first time t1. The user input position P1 may be defined by a user touch input on a touch display displaying the sensed image 10 at the first time t1. The position P1' of an object that is included in the sensed image 10 at the first time t1 may be defined by a user touch input on a touch display displaying the sensed image 10 at the first time t1.

The user input position P1 may be defined by a user touch input first defining the entry position $11_1$ and then tracing the user input, as indicated by the dashed line, to rest at, and define, the user input position P1.

It will be appreciated that in this example, the new object 20 is detected and tracked and, also, the existing object 30 is detected and tracked.

Referring to FIGS. 8A and 8B, the position condition defines a first entry position $11_1$ where a first object 20 enters a sensed image 10, defines a second entry position $11_1'$ where a second object 20' enters a sensed image 10, and defines a capture position defining where the first object 20 and the second object 20' are relatively positioned when automatic capture of the sensed image 10 occurs.

In this example, the capture position is user-defined as a relative displacement within the sensed image 10. In this example, the relative displacement is defined as the position between a user input position P1 (for the first object 20) and a user input position P1' (for the second object 20'). The relative displacement is P1'-P1.

In this example, it is necessary and sufficient for satisfaction of the position condition that a first object 20, that is to be captured in a sensed image 10, has entered 22 the sensed image 10 via the entry position $11_1$, that a second object 20', that is to be captured in a sensed image 10, has entered 22 the sensed image 10 via the entry position $11_1'$, and that the first object 20 and second object 20' have moved 22 to a position such that the relative displacement (P2'-P2) between a position P2 of the first object 20 that has entered the sensed image 10 and the position P2' of the second object 20' that has entered the sensed image 10, equals the relative displacement P1'-P1.

The capture position may be defined by one or more user touch inputs on a touch display displaying the sensed image 10 at the first time t1. The user input position P1 may be defined by a user touch input on a touch display displaying the sensed image 10 at the first time t1. The user input position P1' may be defined by a user touch input on a touch display displaying the sensed image 10 at the first time t1.

The user input position P1 may be defined by a user touch input first defining the entry position $11_1$ (for the first object 20) and then being traced to rest at, and define, the user input position P1 (for the first object 20).

The user input position P1' may be defined by a user touch input first defining the entry position $11_1'$ (for the second object) and then being traced to rest at, and define, the user input position P1' (for the second object 20').

Figure 9:
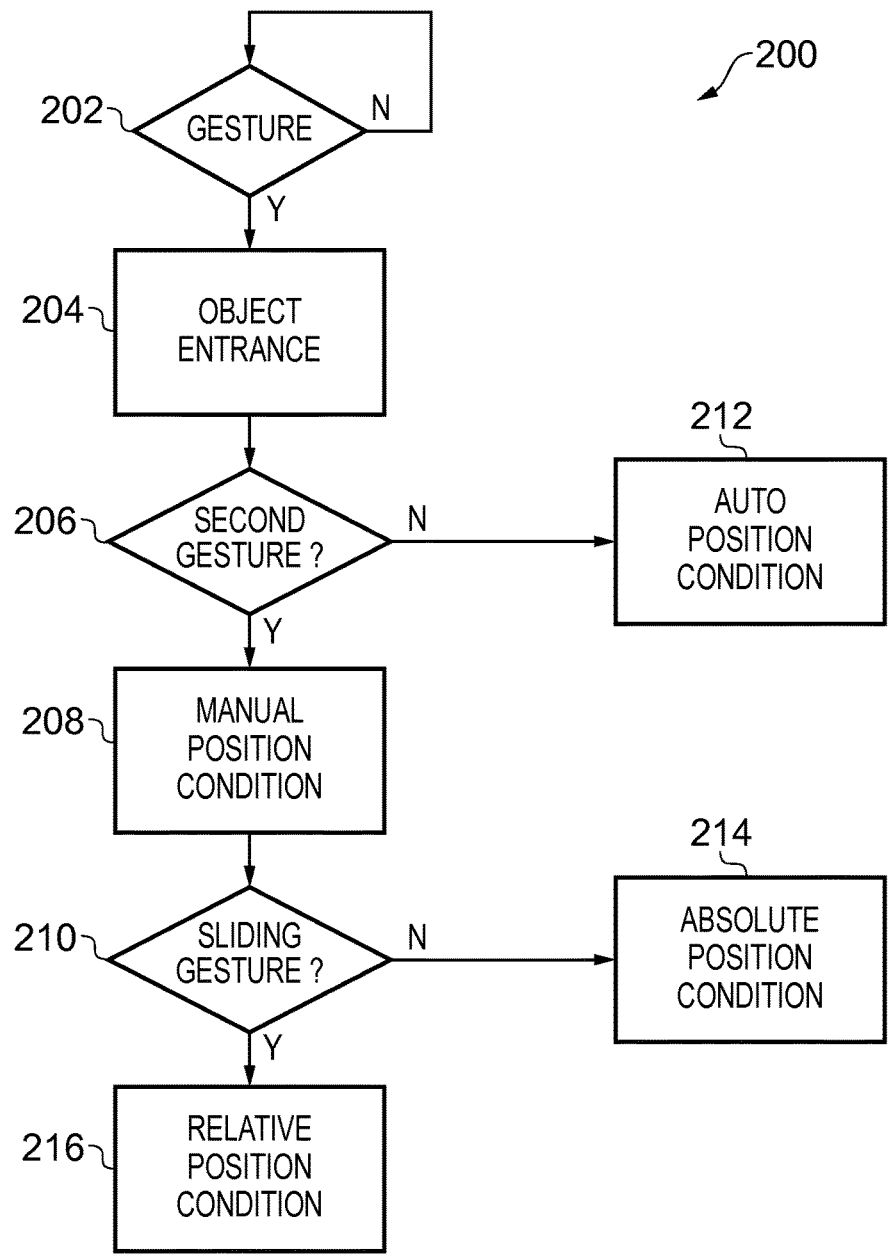
FIG. 9 illustrates an example of method that enables different user-input gestures to determine different position conditions in respect of an object that is yet to be included in a sensed image.

FIG. 9 illustrates an example of method 200 comprising logic that enables different user-input gestures to determine different position conditions in respect of an object that is yet to be included in a sensed image 10.

At block 202, if a first gesture is detected the method proceeds to block 204. At block 204 an entry position 11, where an object 20 enters a sensed image 10, is determined based on the first gesture.

Next at block 206, if a second gesture is detected the method proceeds to block 208. At block 208 a manual position condition is determined.

If a second gesture is not detected, the method proceeds to block 212. At block 212, a position condition is automatically determined. The position condition may, for example, require the object to move to a particular capture position, dependent upon the first gesture, to trigger automatic capture of a sensed image 10, for example as described previously with respect to FIGS. 3A and 3B. The capture position is defined in respect of an object 20 that is yet to be included in the sensed image 10 and is where automatic capture of a sensed image 10 occurs.

After block 208, at block 210, if a third gesture is detected the method proceeds to block 216. At block 216 a relative position condition is automatically determined. The position condition may, for example, require the object to move to a particular capture position, dependent upon the relative positions of the second and third gestures, to trigger automatic capture of a sensed image 10, for example as described previously with respect to FIGS. 7A and 7B or 8A and 8B. The capture position is defined in respect of an object that is yet to be included in the sensed image 10 and another object and is where automatic capture of a sensed image 10 occurs.

If a third gesture is not detected, the method proceeds to block 214. At block 214, a position condition is automatically determined. The position condition may, for example, require the object to move to a particular capture position, dependent upon the second gesture, to trigger automatic capture of a sensed image 10, for example as described previously with respect to FIGS. 5A and 5B. The capture position is defined in respect of an absolute position of an object that is yet to be included in the sensed image 10 and is where automatic capture of a sensed image 10 occurs.

Figure 10:
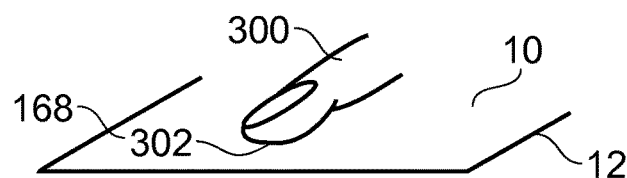
FIG. 10 illustrates an example of a gesture detected by a touch sensitive display.

As illustrated in FIG. 10, in some but not necessarily all examples, the first gesture may be a user touch input 302 on a touch display 168 displaying the sensed image 10 at the first time t1, the second gesture may be a user touch input 302 on the touch display 168 displaying the sensed image 10 at the first time t1, and the third gesture may be a trace of a user touch input 302 on the touch display 168 displaying the sensed image 10 at the first time t1.

Although FIG. 10 illustrates particular types of gestures, other gestures may be used as a user input. A gesture user input is a gesture that has meaning to an apparatus as a user input. A gesture may be static or moving. A moving gesture may comprise a predetermined movement or a predetermined movement pattern comprising a series of movements. A moving gesture may, for example, be an apparatus-independent gesture or an apparatus-dependent gesture. An apparatus-independent gesture is decoupled from the user apparatus and involves movement of a user input object 300 e.g. a user body part or parts, or a further apparatus, relative to the user apparatus. The movement may be three dimensional, for example, through a space external to the apparatus. The body part may comprise the user's hand or part of the user's hand such as one or more fingers and thumbs. In other examples, the user input object may comprise a different part of the body of the user such as their head. An apparatus-dependent gesture involves movement of a user apparatus through space. The movement may be three dimensional. Three-dimensional movement may comprise motion of the user input object 300 in any three orthogonal directions. The motion may comprise the user input object 300 moving towards or away from an apparatus as well as moving in a plane parallel to the apparatus or any combination of such motion. A gesture may be a non-contact gesture. A non-contact gesture does not contact the apparatus at any time during the gesture. A gesture may be a contact gesture. A contact gesture does contact the apparatus during the gesture. A gesture may be an absolute gesture that is defined in terms of an absolute displacement from the user apparatus. Such a gesture may be tethered, in that it is performed at a precise location relative to the apparatus. Alternatively a gesture may be a relative gesture that is defined in terms of relative displacement during the gesture.

Such a gesture may be un-tethered, in that it need not be performed at a precise location relative to the apparatus and may be performed at a large number of arbitrary locations. A gesture may be defined as evolution of displacement, of a tracked point relative to an origin, with time. It may, for example, be defined in terms of motion using time variable parameters such as displacement, velocity or using other kinematic parameters. An un-tethered gesture may be defined as evolution of relative displacement Δd with relative time Δt. A gesture may be performed in one dimension (1D gesture), two-dimensions (2D gesture) or three dimensions (3D gesture). Any suitable gesture detector may be used to detect a gesture. Examples of suitable detectors include a proximity detector, a touch detector, one or more cameras, for example, stereoscopic cameras, accelerometers, strain gauges or any other suitable means. Many different gestures are possible as gesture user inputs.

As illustrated in FIG. 11, an algorithm detects 110 a moving object. The detected object 20 may, for example, be an object that is not yet in the sensed image or has newly entered into the sensed image 10. The algorithm tracks 112 the object in space. Suitable algorithms for detecting and tracking objects are known to the person of ordinary skill in the art.

Detecting and tracking an object outside the sensed image 10 may be achieved using stereoscopic cameras or other techniques for forming depth maps outside the sensed image 10. The algorithm tracks 112 the object outside the sensed image 10 and can determine when the object is about to enter the sensed image 10. The camera settings may be pre-set for capturing an image comprising the object 20, for example as described in relation to FIG. 12.

Detecting and tracking an object inside the sensed image 10 may be achieved using image processing. For example, by monitoring changes over time of the pixels of the sensed image 10, the algorithm detects 110 a moving object (a group of contiguous pixels that changes position). The detected object 20 may, for example, be an object that has newly entered into the sensed image 10. The algorithm tracks 112 the object (the group of contiguous pixels) through the sensed image 10 and can determine when the object has reached a particular position within the sensed image 10 or relative to another object within the sensed image 10. Suitable algorithms for detecting and tracking objects are known to the person of ordinary skill in the art.

Figure 12:
FIG. 12 illustrates an example of a method for automatically determining camera settings.

Referring back to FIG. 1, after block 102 but before block 104, the method 100 may further comprise a block 140 as illustrated in FIG. 12. At block 140 camera settings, including at least focus, are automatically determined before the first object has been included in the sensed image at time t2. The determined camera settings are then used during automatic capture of the sensed image 10 at block 106.

The camera settings that are pre-set at block 140 may, for example include auto-focus settings. The auto-focus settings may, for example, be such that the object 20, when it enters the sensed image 10 is in sharp focus. Alternatively, the auto-focus settings may, for example, be such that the object 20, when it enters the sensed image 10 is in out-of-focus and blurred.

The camera settings that are pre-set at block 140 may, for example include depth of field as determined by a camera aperture. The depth of field may, for example, be such that the object 20, when it enters the sensed image 10, and other objects are in sharp focus. Alternatively, the depth of field settings may, for example, be such that the object 20, when it enters the sensed image 10 is outside the depth of field.

Referring back to FIG. 1, after block 104 but before block 106, the method 100 may further comprise a block 140 as illustrated in FIG. 12. At block 140 camera settings, including at least focus, are automatically adjusted using image data specifically relating specifically to the object 20.

Figure 13:
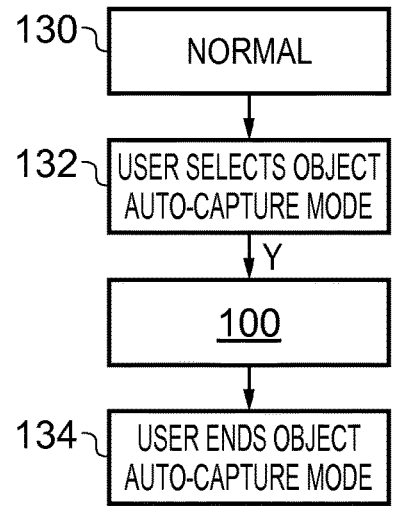
FIG. 13 illustrates an example of method for enabling and disabling an object auto-capture mode.

FIG. 13 illustrates a method 131 for enabling the method 100 of FIG. 1 and disabling the method 100 of FIG. 1.

At block 130, a camera system is operating in a default mode. At block 132, a user starts an object auto-capture mode via a menu or otherwise. This enables the method 100.

After automatic capture of the sensed image 10 at block 106 of the method 100, the method 131 presents a selectable option to the user for exiting the object auto-capture mode and returning to block 130.

Figure 14:
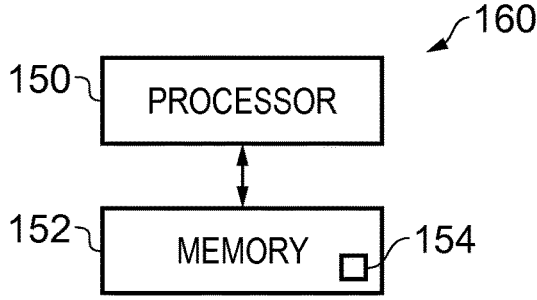
FIG. 14 illustrates an example of a controller.
Figure 16:
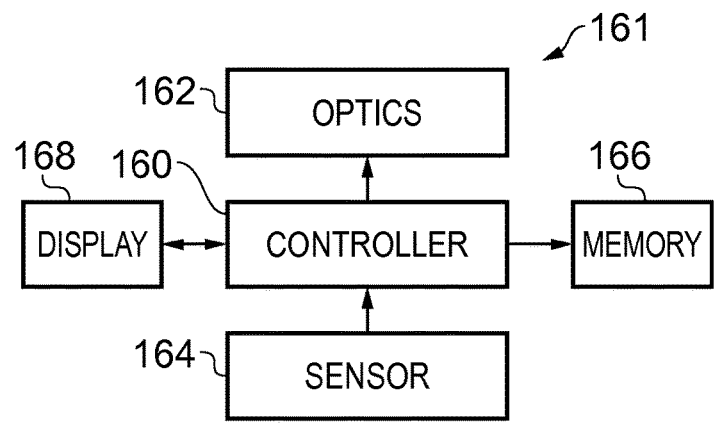
FIG. 16 illustrates an example of a camera system.

Some or all of the above described methods of FIGS. 1 to 13 may be performed by a controller 160 as illustrated in FIG. 14 and/or FIG. 16.

Implementation of the controller 160 may be as controller circuitry. The controller 160 may be implemented in hardware alone, have certain aspects in software including firmware alone or can be a combination of hardware and software (including firmware).

As illustrated in FIG. 14 the controller 160 may be implemented using instructions that enable hardware functionality, for example, by using executable computer program instructions 154 in a general-purpose or special-purpose processor 150 that may be stored on a computer readable storage medium (disk, memory etc.) to be executed by such a processor 150.

The processor 150 is configured to read from and write to the memory 152. The processor 150 may also comprise an output interface via which data and/or commands are output by the processor 150 and an input interface via which data and/or commands are input to the processor 150.

The memory 152 stores a computer program 154 comprising computer program instructions (computer program code) that controls the operation of the apparatus 161 when loaded into the processor 150. The computer program instructions, of the computer program 154, provide the logic and routines that enables the apparatus to perform the methods illustrated in any or all of FIGS. 1 to 13. The processor 150 by reading the memory 152 is able to load and execute the computer program 154.

The apparatus 161 therefore comprises:
at least one processor 150; and
at least one memory 152 including computer program code 154
the at least one memory 152 and the computer program code 154 configured to, with the at least one processor 150, cause the apparatus 161 at least to perform:
at a first time, processing 102 a user-input to determine a position condition defined in respect of an object that is yet to be included in a sensed image 10; and
after the first time, automatically capturing 106 a sensed image 10 including a first object 20 not included in the sensed image 10 at the first time, in response to an automatic determination 104 that the user-input position condition is satisfied in respect of the first object 20.

Figure 15:
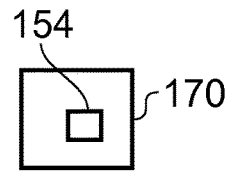
FIG. 15 illustrates an example of a delivery mechanism for a computer program.

As illustrated in FIG. 15, the computer program 154 may arrive at the apparatus 161 via any suitable delivery mechanism 170. The delivery mechanism 170 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 154. The delivery mechanism may be a signal configured to reliably transfer the computer program 154. The apparatus 161 may propagate or transmit the computer program 154 as a computer data signal.

Although the memory 152 is illustrated as a single component/circuitry it may be implemented as one or more separate components/circuitry some or all of which may be integrated/removable and/or may provide permanent/semi-permanent/dynamic/cached storage.

Although the processor 150 is illustrated as a single component/circuitry it may be implemented as one or more separate components/circuitry some or all of which may be integrated/removable. The processor 150 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIGS. 1 to 13 may represent steps in a method and/or sections of code in the computer program 154. The illustration of a particular order to the blocks does not necessarily imply that there is a required or preferred order for the blocks and the order and arrangement of the block may be varied. Furthermore, it may be possible for some blocks to be omitted.

FIG. 16 illustrates a camera system 161 comprising a controller 160, a camera sensor 164, a touch display 168 and optics 162.

Although a display 168 is illustrated that is touch-sensitive (a touch display), the camera system may alternatively comprise a display 168 and an alternative gesture detector.

The controller 160 is configured to display a sensed image 10 detected at the camera sensor 164 on the display 168, which operates as a view finder.

The controller 160 is configured to control the camera settings of the camera system 161 by, for example, controlling the optics 162 to change the focus settings of the optics and/or change an aperture of the optics.

The controller 160 is configured to capture a sensed image 10 by storing the sensed image 10 in a data structure within addressable memory 166.

The camera system 161 may, in some examples, be comprised in a different apparatus.

The camera system 161 may, in some examples, be comprised in a single apparatus. In some embodiments, this apparatus may be a pocket-sized apparatus suitable for being placed in an inside pocket of a jacket.

The controller 160 may be configured to perform any one or more of the methods previously described and as illustrated in the preceding figures.

Where a structural feature has been described, it may be replaced by means for performing one or more of the functions of the structural feature whether that function or those functions are explicitly or implicitly described.

The controller 160 provides means for processing, at a first time, a user-input to determine a position condition defined in respect of an object that is yet to be included in a sensed image 10.

The controller 160 provides means for automatically capturing, after the first time, a sensed image 10 including a first object 20 not included in the sensed image 10 at the first time, in response to determination that the user-input position condition is satisfied in respect of the first object 10.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising at least one processor and at least one memory including program code instructions, the memory and program code instructions being configured to, with the at least one processor, cause the apparatus to at least:
   process, at a first time, a user-input to determine a position condition that defines a capture position in respect of an object that is yet to be included in a sensed image and an entry position at a predetermined distance from the capture position, wherein the object is not included in the sensed image when the user-input position condition is defined at the first time, and wherein the capture position is defined relative to another object within the sensed image; and
   automatically capture, after the first time, a sensed image including a first object not included in the sensed image at the first time, in response to determination that the user-input position condition is satisfied in that the first object has entered the sensed image via the entry position and the first object has moved to the capture position.

2. An apparatus of claim 1, wherein the entry position is defined by a user touch input on a touch display displaying the sensed image at the first time.

3. An apparatus of claim 1, wherein the sensed image has a perimeter, and wherein the entry position is a portion of the perimeter.

4. An apparatus of claim 1, wherein the position condition defines when automatic capture of a sensed image occurs.

5. An apparatus of claim 4, wherein the position condition defines a capture position, defined in respect of an object that is yet to be included in the sensed image at the first time, where automatic capture of a sensed image occurs, the captured image including an object, not included in the sensed image at the first time, that satisfies the position condition.

6. An apparatus of claim 5,
   wherein the capture position is at least one of:
   a predefined distance, within the sensed image, from a perimeter of the sensed image;
   a user-defined absolute position within the sensed image; and a user-defined relative position within the sensed image.

7. An apparatus of claim 5,
   wherein the capture position is defined by one or more user touch inputs on a touch display displaying the sensed image.

8. An apparatus of claim 7,
   wherein the capture position is at least one of:
   a predefined distance, within the sensed image, from a user touch input on a touch display displaying the sensed image;
   a user-defined absolute position defined by a user touch input on a touch display displaying the sensed image; and
   a user-defined relative position defined by a relative distance between two or more user touch inputs on a touch display displaying the sensed image.

9. An apparatus of claim 1, wherein a first gesture defines a position where an object enters a sensed image and wherein an absence of a second gesture defines automatically a capture position, defined in respect of the object that is yet to be included in the sensed image, where automatic capture of a sensed image occurs; and wherein a second gesture defines manually a capture position, defined in respect of the object that is yet to be included in the sensed image, where automatic capture of a sensed image occurs.

10. An apparatus of claim 1, wherein a first gesture and a second gesture performed in respect of a display displaying the sensed image define manually a first position and a second position, wherein automatic capture of a sensed image occurs after an object has entered the sensed image at the first position reaches the second position.

11. An apparatus of claim 1, wherein a first gesture and a second gesture performed in respect of a display displaying the sensed image define manually a first position associated with a first object that is not included in the sensed image at the first time and a second position associated with a second object that is included in the sensed image at the first time, wherein automatic capture of a sensed image occurs when an object, after entering the sensed image, reaches a position within the sensed image that has a relative displacement from a position of the second object within the sensed image equal to a relative displacement of the first position from the second position.

12. An apparatus of claim 1, configured to automatically determine settings, including at least focus, before the first object has been included in the sensed image and to use the automatically determined setting to capture the first image.

13. A method comprising:
   at a first time, processing a user-input to determine a position condition that defines a capture position in respect of an object that is yet to be included in a sensed image and an entry position at a predetermined distance from the capture position, wherein the object is not included in the sensed image when the user-input position condition is defined at the first time, and wherein the capture position is defined relative to another object within the sensed image; and
   after the first time, automatically capturing a sensed image including a first object not included in the sensed image at the first time, in response to an automatic determination that the user-input position condition is satisfied in that the first object has entered the sensed image via the entry position and the first object has moved to the capture position.

14. A method of claim 13, wherein the position condition defines when automatic capture of a sensed image occurs.

15. A method of claim 13, wherein a first gesture defines a position where an object enters a sensed image and wherein an absence of a second gesture defines automatically a capture position, defined in respect of the object that is yet to be included in the sensed image, where automatic capture of a sensed image occurs; and wherein a second gesture defines manually a capture position, defined in respect of the object that is yet to be included in the sensed image, where automatic capture of a sensed image occurs.

16. A method of claim 13, wherein a first gesture and a second gesture performed in respect of a display displaying the sensed image define manually a first position and a second position, wherein
   automatic capture of a sensed image occurs after an object has entered the sensed image at the first position reaches the second position.

17. A method of claim 13, wherein a first gesture and a second gesture performed in respect of a display displaying the sensed image define manually a first position associated with a first object that is not included in the sensed image at the first time and a second position associated with a second object that is included in the sensed image at the first time, wherein automatic capture of a sensed image occurs when an object, after entering the sensed image, reaches a position within the sensed image that has a relative displacement from a position of the second object within the sensed image equal to a relative displacement of the first position from the second position.

18. A computer program product comprising at least one non-transitory computer-readable storage medium having computer-readable program instructions stored therein with the computer-readable program instructions comprising program instructions arranged to:

at a first time, process a user-input to determine a position condition that defines a capture position in respect of an object that is yet to be included in a sensed image and an entry position at a predetermined distance from the capture position, wherein the object is not included in the sensed image when the user-input position condition is defined at the first time, and wherein the capture position is defined relative to another object within the sensed image; and after the first time, automatically capture a sensed image including a first object not included in the sensed image at the first time, in response to an automatic determination that the user-input position condition is satisfied in that the first object has entered the sensed image via the entry position and the first object has moved to the capture position.

\* \* \* \* \*